Feb. 7, 1950 L. A. WARD 2,496,834
GAS VALVE CONSTRUCTION
Filed Jan. 28, 1944 4 Sheets-Sheet 3

INVENTOR
Leslie A. Ward
Charles A. Warren
ATTORNEY

Feb. 7, 1950 L. A. WARD 2,496,834
GAS VALVE CONSTRUCTION
Filed Jan. 28, 1944 4 Sheets-Sheet 4

INVENTOR
Leslie A. Ward
Charles A. Warren
ATTORNEY

Patented Feb. 7, 1950

2,496,834

UNITED STATES PATENT OFFICE 2,496,834

GAS VALVE CONSTRUCTION

Leslie A. Ward, Hartford, Conn., assignor to United Aircraft Corporation, East Hartford, Conn., a corporation of Delaware Application January 28, 1944, Serial No. 520,070

7 Claims. (Cl. 277—46)

This invention relates to a mounting for a gas valve.

Eichelberg Patent No. 2,199,307 has resilient U-shaped valve plates held in position in a supporting base by splitter vanes which are in turn clamped by holding screws mounted in the base. Assembly of this structure requires individual mounting of splitter vanes within the base. An object of this invention is to overcome this difficulty by an arrangement of splitter vanes with projecting lugs by which a number of vanes may be clamped simultaneously in assembling the valve structure.

In multiple valve structures of this type each valve should be held in position by substantially the same clamping pressures. A feature of this invention is a splitter vane for each valve having resilient lugs engaging with the clamping means.

Another feature of this invention is a hollow splitter vane to reduce the weight of the valve structure. This is especially desirable when the valve structure is used in aircraft.

Another feature is a splitter vane formed from sheet material with the projecting lugs integral with the vane.

Other objects and advantages will be apparent from the specification and claims and from the accompanying drawings which illustrate an embodiment of the invention.

Figure 1:
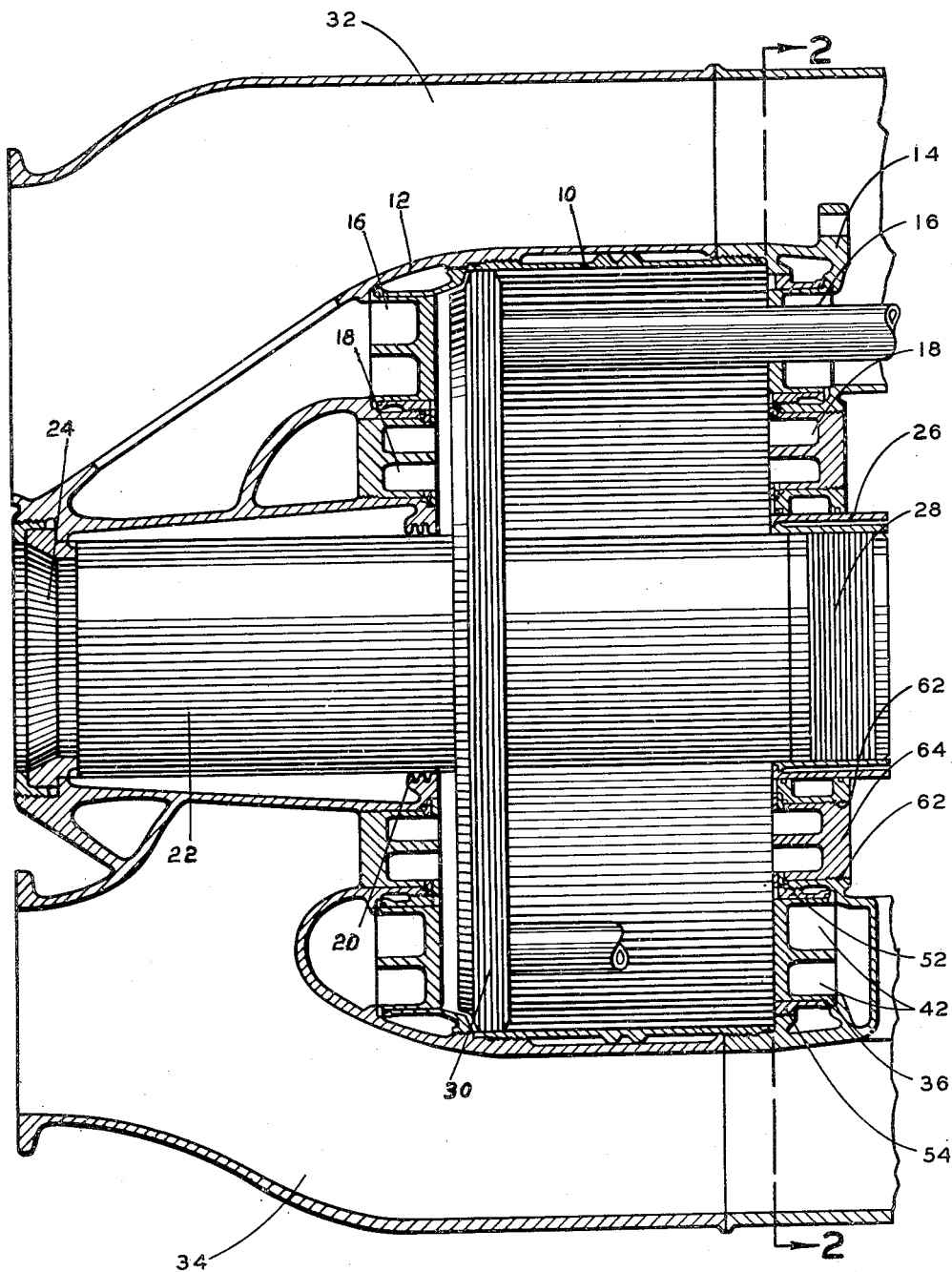
Fig. 1 is a sectional view through the compressor cylinder of a free-piston unit showing the mounting for the gas valve.

The valve structure is shown in the compressor heads of a free-piston engine-and-compressor unit which may be the type shown in the copending Kalitinsky application, Serial No. 486,615, filed May 11, 1943, which matured into Patent No. 2,408,427 on October 1, 1946. The compressor cylinder 10 has outer and inner heads 12 and 14 in each of which, sets of both intake valves 16 and discharge valves 18 are mounted. Head 12 may have a central opening 20 for the sleeve 22, which in conjunction with a piston 24 fitting within the sleeve forms an air spring for moving the piston assembly to the right. Head 14 has a central opening which receives the engine cylinder 26 in which the engine piston 28, attached to the compressor piston 30, is slidable.

The sets of valves 16 and 18 are arranged in rings around the central openings in heads 12 and 14, the discharge valves being preferably between the intake valves and the central opening. The sets of valves are similar in construction and only the intake valves will be described in detail. The intake valves are mounted to permit gas flow into the cylinder from manifold 32 and gas discharges from the cylinder through valves 18 into manifold 34.

Figure 2:
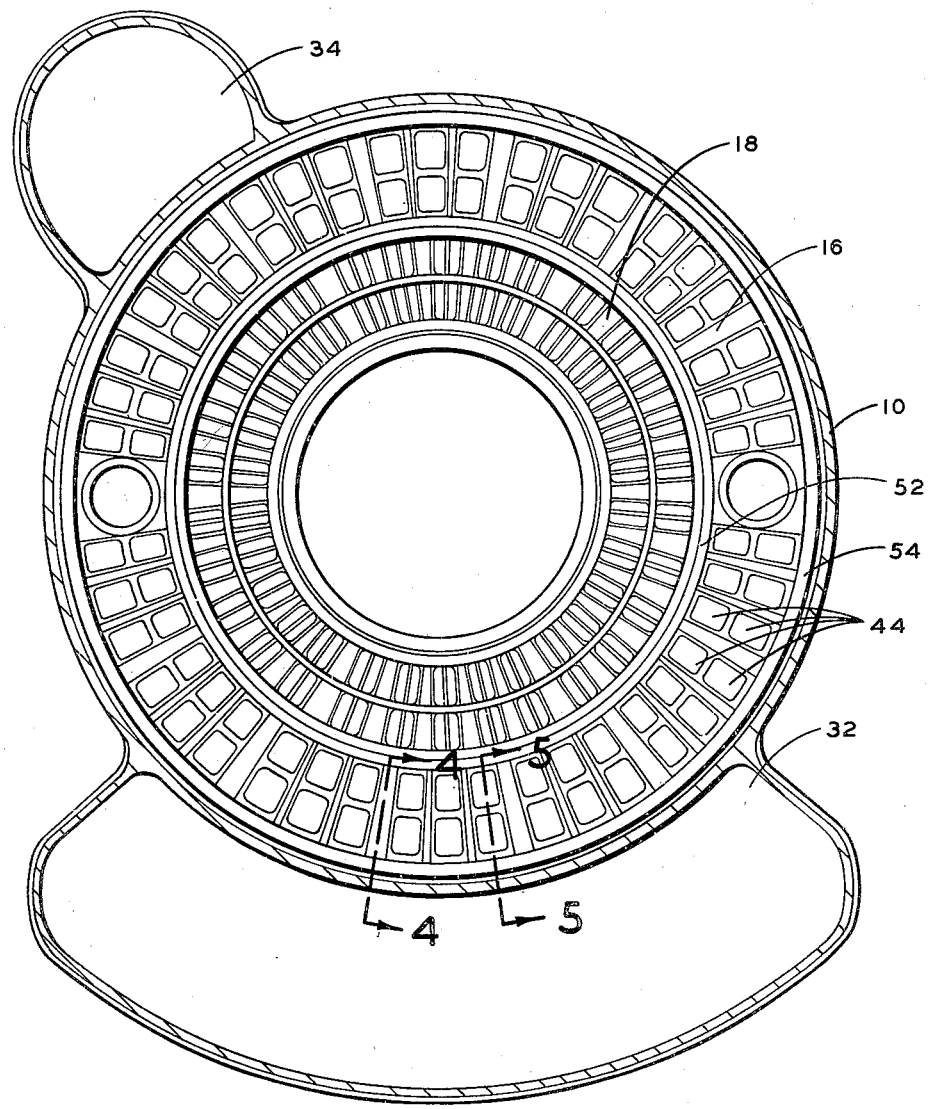
Fig. 2 is a sectional view on the line 2—2 of Fig. 1.
Figure 3:
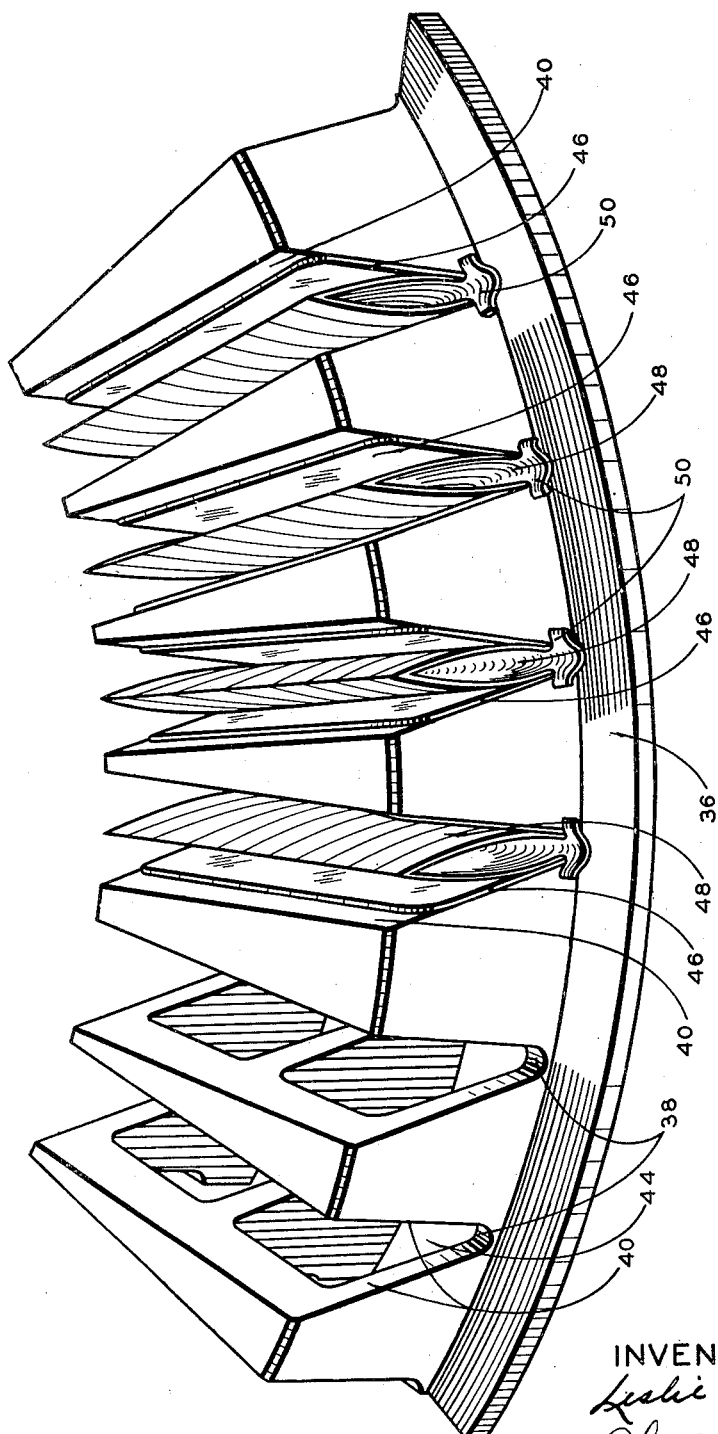
Fig. 3 is a perspective view of a part of one set of valves.
Figure 4:
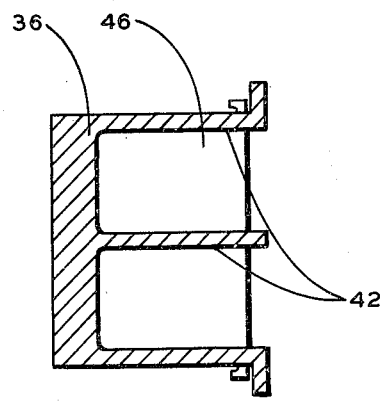
Fig. 4 is a sectional view substantially on line 4—4 of Fig. 2 showing the valve plate and splitter vane in position.
Figure 5:
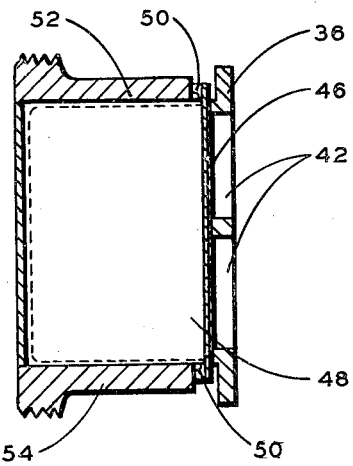
Fig. 5 is a sectional view on the line 5—5 of Fig. 2 also showing the valve plate and splitter vane.

The set of intake valves 16 includes a circular base 36 having a number of radial U-shaped grooves 38 therein. The opposite surfaces of each groove which form valve seats 40 extend at acute angles to the axis of the compressor. One or more large circular slots 42 in the base intersect grooves 38 to form gas passages 44, Fig. 2, through which gas enters the compressor cylinder. The gas flow through passages 44 is at an acute angle to the valve seats 40.

Each groove 38 receives a substantially U-shaped valve plate 46, the legs of which engage the valve seats 40 and close the gas passages. The valve plates are clamped in the bases of grooves 38 by splitter vanes 48 which have projecting lugs 50 adjacent their leading edges, to be engaged by clamping rings 52 and 54. These rings, as shown in Fig. 1, are threaded in the compressor head. Clamping rings 52 and 54 hold the splitter vanes and the valve plates securely within the grooves 38, the shape of the splitter vane permitting the legs of the U-shaped valve plate to move toward each other in opening the valve passages for gas flow through the valve.

Figure 7:
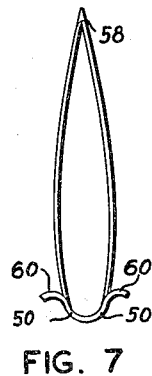
Fig. 7 is an end view of the splitter vane.
Figure 6:
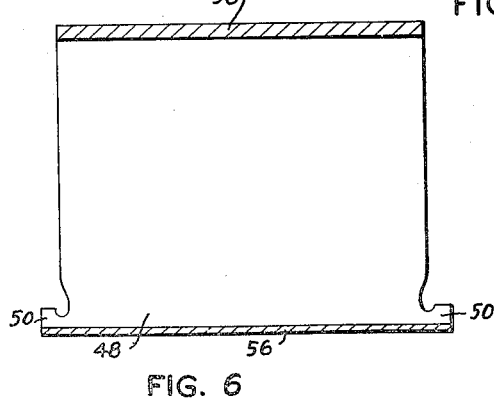
Fig. 6 is a sectional view of the splitter vane.

The lugs 50 as above stated, are integral with the vanes and are preferably made resilient so that each of the splitter vanes will be held in position by substantially the same pressure. Each vane 48 may be formed from sheet material bent centrally, at 56, to fit the valve plate and with opposite edges of the sheet material connected to form the pointed trailing edge 58 of the vane, and to give to the vane a streamlined cross-section. The lugs 50 which are integral projections on the sheet material from which the vane is formed, are bent, as best shown in Fig. 7 to the same curvature as the splitter vane. The outer ends of each lug have outwardly curved ends 60 to engage resiliently with clamping rings 52 and 54.

In assembly, the valve base being positioned in head 14, the plates and splitter vanes are positioned in the grooves in the valve base and the clamping rings are then screwed into the head to engage the projecting lugs 50 on the splitter vane and hold the vanes and valve plates in place.

The discharge valves are similar in construction to the intake valves, differing primarily in the formation of threads 52 on the discharge valve base 64 so that the base itself is screwed into head 14 after the valve plates and splitter vane are in position in the base.

It is to be understood that the invention is not limited to the specific embodiment herein illustrated and described, but may be used in other ways without departure from its spirit as defined by the following claims.

I claim:

1. In a gas valve device, a base having a plurality of grooves, the boundary surfaces of which form valve seats, a valve in each groove engaging the seat, side members closing the ends of the groove, and clamping means for holding each valve against the base of the groove, said clamping means having resilient projections extending laterally beyond the ends of the grooves for engagement by said side members to hold the clamping means against the valves.

2. In a gas valve device, a base having a plurality of grooves, the boundary surfaces of which form valve seats, a valve in each groove engaging the seat, side members closing the ends of the grooves, and a splitter vane for holding each valve against the base of the groove, said vane having resilient projections extending laterally beyond the ends of the groove for engagement by said side members in holding the splitter vane in position.

3. In a gas valve device, an annular valve base having a plurality of substantially radial grooves therein and passages communicating with said grooves, valves in said grooves, clamping means for each valve, said means having resilient projections extending beyond the ends of the grooves and rings at opposite ends of the grooves and engageable with the projections on the clamping means for holding said clamping means in position.

4. In a gas valve device, an annular valve base having a plurality of substantially radial grooves therein and passages communicating with said grooves, valve plates in said grooves, a splitter vane for retaining each valve plate and having resilient projections extending beyond the ends of the grooves, and means at opposite ends of the grooves extending over and engaging a number of the projections for holding the splitter vanes in position.

5. In a gas valve, a base having a U-shaped valve seat, a U-shaped valve plate engaging said seat, a splitter vane engaging said valve plate and clamping it against the base of the seat, and resilient means for holding said splitter vane against the plate.

6. In a gas valve, a base having a U-shaped valve seat, a valve plate engaging said seat, a splitter vane engaging said valve plate for retaining the plate in position, said vane having resilient lugs thereon, and clamping means engaging said lugs to hold the vane in position.

7. In a valve assembly, a ring-shaped valve base having a plurality of radially extending valve seats, and passages communicating with the seats, valve plates engaging said seats, vanes engaging said valve plates for retaining the plates in position, said vanes having resilient projecting lugs thereon, and threaded concentric clamping rings inside and outside of said base engaging with the projections to hold the vanes in position.

LESLIE A. WARD.

REFERENCES CITED

The following references are of record in the file of this patent:

UNITED STATES PATENTS

| Number | Name | Date |
|---|---|---|
| 181,295 | Weimer | Aug. 22, 1876 |
| 247,857 | Thompson | Oct. 4, 1881 |
| 456,643 | Watt | July 28, 1891 |
| 1,022,157 | Scott | Apr. 2, 1912 |
| 1,693,619 | Sandford | Dec. 4, 1928 |
| 1,780,524 | Huff | Nov. 4, 1930 |
| 2,199,307 | Eichelberg | Apr. 30, 1940 |
| 2,292,003 | Yant | Aug. 4, 1942 |
| 2,408,056 | Farmer | Sept. 24, 1946 |

FOREIGN PATENTS

| Number | Country | Date |
|---|---|---|
| 496,795 | Great Britain | Dec. 6, 1938 |
| 526,671 | Great Britain | Sept. 24, 1940 |